United States Patent
You et al.

(10) Patent No.: US 10,093,192 B2
(45) Date of Patent: Oct. 9, 2018

(54) CHARGING DEVICE FOR VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Hyun Jong You, Uiwang-si (KR); Chang Kiun Kwark, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/281,903

(22) Filed: Sep. 30, 2016

(65) Prior Publication Data

US 2017/0297443 A1    Oct. 19, 2017

(30) Foreign Application Priority Data

Apr. 19, 2016    (KR) .................... 10-2016-0047687

(51) Int. Cl.
*H01R 13/62*     (2006.01)
*B60L 11/18*     (2006.01)
(Continued)

(52) U.S. Cl.
CPC ...... B60L 11/1818 (2013.01); H01R 13/6395 (2013.01); H01R 13/641 (2013.01); *B60L 2230/12* (2013.01)

(58) Field of Classification Search
CPC ............ B60L 11/1818; H01R 13/6395; H01R 24/525
(Continued)

(56) References Cited

U.S. PATENT DOCUMENTS 5,596,261 A * 1/1997 Suyama ............... B60L 11/1803
                                                   320/109
5,751,135 A * 5/1998 Fukushima ......... B60L 11/1818
                                                   320/107
(Continued)

FOREIGN PATENT DOCUMENTS

JP    H09-285022 A    10/1997
JP    2010110050 A *  5/2010    ............ B60L 3/0069
(Continued)

OTHER PUBLICATIONS

Notice of Allowance dated Mar. 6, 2017, in corresponding Korean Patent Application No. 10-2016-0047687.

*Primary Examiner* — Tulsidas C Patel
*Assistant Examiner* — Peter G Leigh
(74) *Attorney, Agent, or Firm* — McDermott Will & Emery LLP

(57) ABSTRACT

A charging device for a vehicle includes: a charge port connected to a charge cable and accessible from the outside of the vehicle; a locking device locking the charge cable to the charge port; a battery configured to be charged by electric power supplied from the charge cable; a button including an icon that is turned on according to a lock setting state and accessible from the outside of the vehicle; and a processor configured to change a lock setting state of the charge cable and the charge port according to a user input received through the button, turn on or turn off the icon included in the button according to the lock setting state, and control locking of the locking device according to the lock setting state.

18 Claims, 6 Drawing Sheets

(51) Int. Cl.
*H01R 13/639* (2006.01)
*H01R 13/641* (2006.01)

(58) Field of Classification Search
USPC .......................................... 439/373; 340/455
See application file for complete search history.

(56) References Cited

U.S. PATENT DOCUMENTS

| | | | | |
|---|---|---|---|---|
| 5,757,595 | A * | 5/1998 | Ozawa | B60L 11/1818 320/104 |
| 7,999,665 | B2 * | 8/2011 | Chander | B60L 11/1818 340/455 |
| 8,125,324 | B2 * | 2/2012 | Frey | B60L 3/0069 340/438 |
| 8,845,001 | B2 * | 9/2014 | Kotama | B60L 11/1818 296/97.22 |
| 8,937,538 | B2 * | 1/2015 | Yoshida | B60Q 3/88 340/455 |
| 2011/0043355 | A1 * | 2/2011 | Chander | B60L 11/1818 340/455 |
| 2011/0281452 | A1 * | 11/2011 | Kurumizawa | B60L 11/14 439/304 |
| 2012/0007554 | A1 * | 1/2012 | Kanamori | B60L 11/1824 320/109 |
| 2012/0098488 | A1 * | 4/2012 | Ichikawa | B60L 11/1816 320/109 |
| 2012/0179319 | A1 * | 7/2012 | Gilman | B60W 50/0097 701/22 |
| 2013/0021162 | A1 * | 1/2013 | DeBoer | B60L 11/1824 340/635 |
| 2014/0042966 | A1 * | 2/2014 | Masuda | B60L 11/1818 320/109 |
| 2014/0170879 | A1 | 6/2014 | Kahara et al. | |
| 2015/0108947 | A1 | 4/2015 | Heuer et al. | |
| 2015/0145479 | A1 * | 5/2015 | DeBoer, III | B60L 11/1824 320/109 |
| 2016/0001667 | A1 * | 1/2016 | Masuda | B60L 11/14 320/109 |

FOREIGN PATENT DOCUMENTS

| | | |
|---|---|---|
| JP | 2012079502 A | 4/2012 |
| JP | 2014-121109 A | 6/2014 |
| JP | 2014166052 A | 9/2014 |
| JP | 5895458 B2 | 3/2016 |
| KR | 10-2013-0072876 A | 7/2013 |
| KR | 10-2015-0067491 A | 6/2015 |

* cited by examiner

CHARGING DEVICE FOR VEHICLE AND CONTROL METHOD THEREOF

CROSS-REFERENCE TO RELATED APPLICATION

This application is claims the benefit of priority to Korean Patent Application No. 10-2016-0047687, filed on Apr. 19, 2016 in the Korean Intellectual Property Office, the entirety of which is incorporated herein by reference.

TECHNICAL FIELD

The present disclosure relates to a charging device that may be included in a vehicle in which a battery is charged, and a control method thereof.

BACKGROUND

In line with the development of electronic technologies, various types of electronic devices have been applied to vehicles. In particular, recently, technologies of driving a motor using electric power supplied from a battery, in addition to raw materials such as gasoline, gas, and the like, have been developed.

When a battery is used as a power source for a vehicle, the battery is generally charged in an electric charging station. Unlike feeding a raw material such as gasoline, or the like, a certain time is required for charging a battery, and here, in a common electric charging station, charging of a battery may be interrupted due to unwanted interference by a third party while the battery is being charged, or the charge cable may be stolen.

SUMMARY

The present disclosure has been made to solve the above-mentioned problems occurring in the prior art while advantages achieved by the prior art are maintained intact.

An aspect of the present disclosure provides a charging device for a vehicle capable of locking a charge cable to a charge port and setting various lock states through a button positioned in the vicinity of the charge port to prevent unwanted interference or burglary of the charge cable while the battery is being charged in an electrical charging station, and a control method thereof.

According to an exemplary embodiment in the present disclosure, a charging device for a vehicle includes: a charge port connected to a charge cable and accessible from the outside of the vehicle; a locking device locking the charge cable to the charge port; a battery configured to be charged by electric power supplied from the charge cable; a button including an icon that is turned on according to a lock setting state and accessible from the outside of the vehicle; and a processor configured to change a lock setting state of the charge cable and the charge port according to a user input received through the button, turn on or turn off the icon included in the button according to the lock setting state, and control locking of the locking device according to the lock setting state.

According to another exemplary embodiment in the present disclosure, a method for controlling a charging device for a vehicle includes: connecting a charge cable to a charge port accessible from the outside of the vehicle; receiving a user input through a button accessible from the outside of the vehicle; changing a lock setting state of the charge cable and the charge port according to the user input; turning on or turning off an icon included in the button according to the lock setting state; and controlling locking of a locking device locking the charge cable to the charge port according to the lock setting state.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments in the present disclosure will be described in detail with reference to the accompanying drawings.

Figure 1:
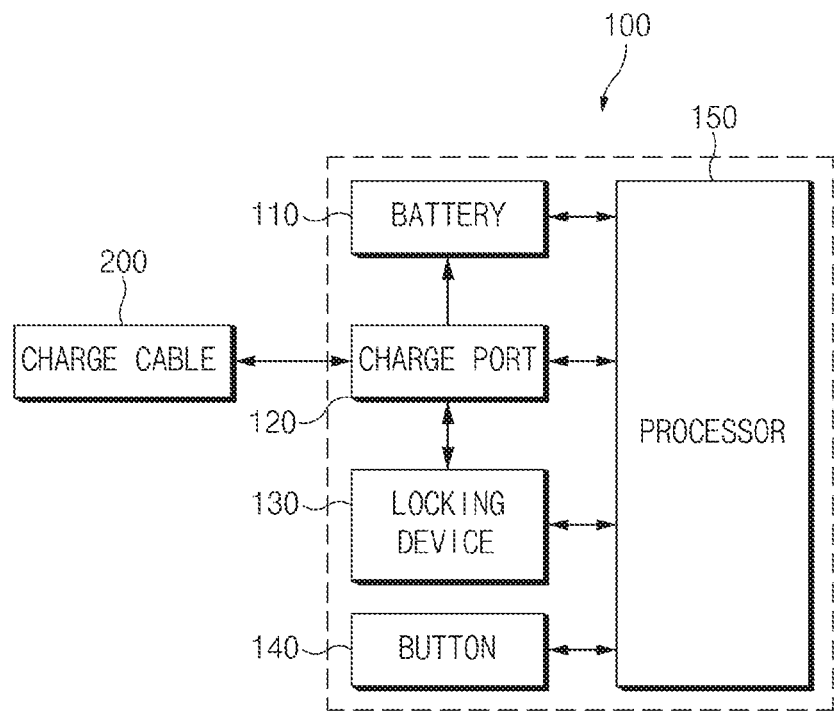
FIG. 1 is a block diagram illustrating a configuration of a charging device for a vehicle according to an exemplary embodiment in the present disclosure.

FIG. 1 is a block diagram illustrating a configuration of a charging device for a vehicle according to an exemplary embodiment in the present disclosure.

Referring to FIG. 1, a charging device 100 for a vehicle may include a battery 110, a charge port 120, a locking device 130, a button 140, and a processor 150.

According to an exemplary embodiment, the battery 110 may supply electric power to the components included in the charging device 100 for a vehicle. According to an exemplary embodiment, the battery 110 may be implemented as a rechargeable battery that can be charged and discharged. For example, the battery 110 may be charged by electric power supplied from an external charge cable 200 connected to the charge port 120.

The charge port 120 may be connected to the external charge cable 200. The charge cable 200 may be fixedly inserted into the charge port 120, and in this state, the charge cable 200 may supply electric power to the battery 110.

In a state in which the charge cable 200 is inserted in the charge port 120, the locking device 130 may be configured to lock or unlock the charge cable 200 from the charge port 120. For example, the locking device 130 may mechanically unite the charge cable 200 and the charge port 120 in the locked state to prevent the charge cable 200 from being released from the charge port 120.

The button 140 may receive a user input. For example, the button 140 may be implemented in a manner of being operated by being pushed by a user or the button 140 may include a touch panel sensing a user's touch operation. According to an exemplary embodiment, the button 140 may include a plurality of icons lit according to a lock setting state. For example, the button 140 may include a first icon indicating whether locking is available to be set, a second icon indicating whether locking has been set, a third icon indicating a first lock state, and a fourth icon indicating a second lock state. According to an exemplary embodiment, the button 140 may include at least one fifth icon indicating a charge state of the battery 110.

According to an exemplary embodiment, the button 140 may include a light source (for example, a light emitting diode (LED) corresponding to each of the icons therein in order to light the icons included in the button 140. For example, the icons may be drawn on a surface of the button 140 with a material (for example, a transparent material) allowing light emitted from an internal light source to pass therethrough.

According to an exemplary embodiment, the charging device 100 for a vehicle may further include a charge cover protecting the charge port and opening and closing the charge port. The charge cover may be accessible from the outside of the vehicle, and when the charge cover is closed, the charge port 120 may not be visible from the outside, and when the charge cover is open, the charge port 120 may be visible from the outside. In order to charge the battery 110, the user may open the charge cover and connect the charge cable 200 to the charge port 120.

Figure 2:
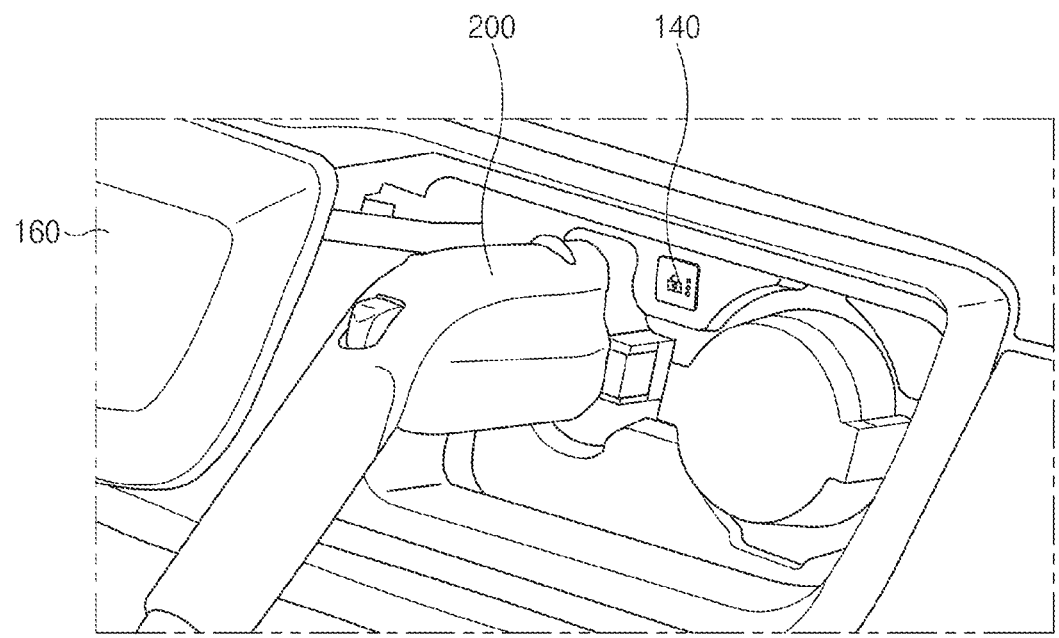
FIG. 2 is a view illustrating a state in which a charge cover is open according to an exemplary embodiment in the present disclosure.

FIG. 2 is a view illustrating a state in which a charge cover is open according to an exemplary embodiment in the present disclosure.

Specifically, FIG. 2 illustrates a state in which the charge cable 200 is connected to the charge port 120 in a state in which the charge cover 160 is open. According to the present exemplary embodiment, the button 140 may be positioned within the charge cover 160. The button 140 may be accessible from the outside of the vehicle in a state in which the charge cover 160 is open. When the charge cover 160 is closed, the button 140 may not be visible from the outside, and when the charge cover 160 is open, the button 140 may be visible from the outside.

The processor 150 may control a general operation of the charging device 100 for a vehicle. For example, the processor 150 may separately control the battery 110, the charge port 120, the locking device 130, and the button 140 to control the locking of the locking device 130 according to an exemplary embodiment in the present disclosure.

According to an exemplary embodiment, the processor 150 may change a lock setting state of the charge cable 200 and the charge port 120 according to a user input (for example, button pressing or button touch) received through the button 140. The lock setting state may include, for example, a lock releasing state in which locking is not set, a first lock state in which locking, which has been set, is released when charging is completed, and a second lock state in which locking, which has been set, is maintained even after charging is completed.

According to an exemplary embodiment, when the charge cover 160 is open or the charge cable 200 is connected to the charge port 120, the processor 150 may change a lock setting state according to a user input. The processor 150 may sequentially change the lock setting state whenever a user input is received. For example, when a user input with respect to the button 140 is received in the lock releasing state, the processor 150 may set the lock setting state to the first lock state, and when a user input with respect to the button 140 is received in the first lock state, the processor 150 may set the lock setting state to the second lock state, and when a user input with respect to the button 140 is received in the second lock state, the processor 150 may set the lock setting state to the lock releasing state.

According to an exemplary embodiment, when a designated period of time (for example, 30 seconds) has elapsed in a state in which the lock setting state is changeable or after a designated user input (for example, when a button is pressed for more than a designated period of time or when the button is touched for a designated period of time) is received, the processor 150 may not change the lock setting state even though a user input is received. For example, the user may complete lock setting by entering a desired lock setting state and waiting or by inputting a designated operation to the button 140.

According to an exemplary embodiment, the processor 150 may turn on or turn off an icon included in the button 140 according to the lock setting state. This will be described with reference to FIGS. 2 to 4C.

Figure 3:
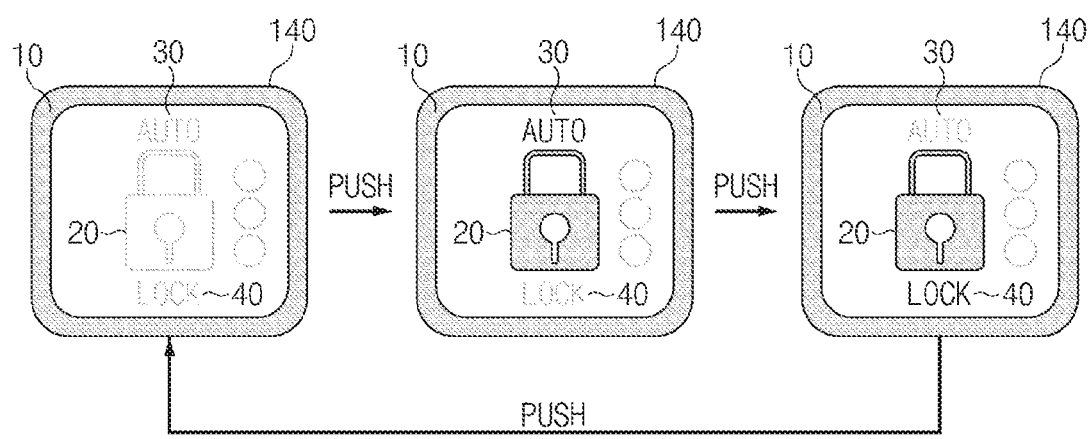
FIG. 3 is a view illustrating a button according to an exemplary embodiment.

FIG. 3 is a view illustrating a button according to an exemplary embodiment in the present disclosure.

Referring to FIG. 3, the button 140 may include a first icon 10 indicating whether locking is available to be set, a second icon 20 indicating whether locking has been set, a third icon 30 indicating a first lock state, and a fourth icon 40 indicating a second lock state.

When the charge cover is opened and the charge cable 200 is connected to the charge port 120, the processor 150 may turn on the first icon 10. With the first icon 10 turned on, when a designated period of time (for example, 30 seconds) has elapsed or when a designated user input (for example, when a button is pressed for more than a designated period of time or when the button is touched for a designated period of time) is received, the processor 150 may turn off the first icon 10. When a user input with respect to the button 140 is received with the first icon 10 turned on, the processor 150 may change the lock setting state, and when a user input with respect to the button 140 is received with the first icon 10 turned off, the processor 150 may not change the lock setting state.

According to an exemplary embodiment, when a user input with respect to the button 140 is received with only the first icon 10 turned on, the processor 150 may turn on the second icon 20 and the third icon 30. The state in which the second icon 20 and the third icon 30 are turned on may correspond to the first lock state in which locking, which has been set, is released when charging is completed, for example. According to an exemplary embodiment, when a user input with respect to the button 140 is received with the first icon 10, the second icon 20, and the third icon 30 turned on, the processor 150 may turn off the third icon 30 and turn on the fourth icon 40. The state in which the second icon 20 and the fourth icon 40 are turned on may correspond to the second lock state in which locking, which has been set, is maintained even after charging is completed, for example. According to an exemplary embodiment, when a user input with respect to the button 140 is received with the first icon 10, the second icon 20, and the fourth icon 40 turned on, the processor 150 may turn off the second icon 20 and the third icon 30. The state in which the second icon 20, the third icon 30, and the fourth icon 40 are turned off may correspond to a lock releasing state in which locking is not set, for example.

Figure 4A:
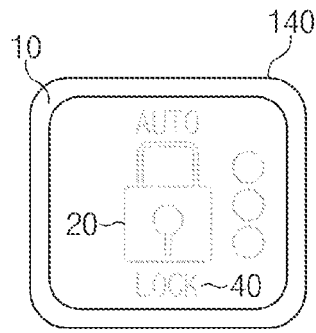
FIGS. 4A-4C are views illustrating a button according to another exemplary embodiment.
Figure 4B:
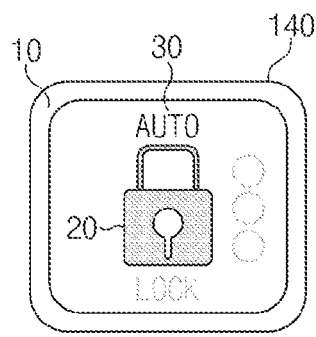
Figure 4C:
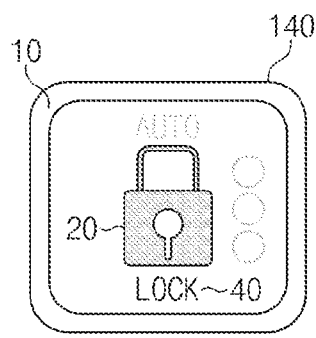

FIGS. 4A-4C are views illustrating a button according to another exemplary embodiment in the present disclosure.

Referring to FIGS. 4A-4C, the button 140 may include a first icon 10 indicating whether locking is available to be set, a second icon 20 indicating whether locking has been set, a third icon 30 indicating a first lock state, and a fourth icon 40 indicating a second lock state.

With the first icon 10 turned on, when a designated period of time (for example, 30 seconds) has elapsed or when a designated user input (for example, when a button is pressed for more than a designated period of time or when the button is touched for a designated period of time) is received, the processor 150 may turn off the first icon 10 and control locking of the locking device 130 according to a lock setting state.

According to an exemplary embodiment, when a designated period of time has elapsed or when a designated user input is received with only the first icon 10 turned on, the processor 150 may turn off the first icon 10 and set the lock setting state to a lock releasing state as illustrated in FIG. 4A. The processor 150 may control the locking device 130 to release locking of the charge cable 200 and the charge port 120 in the lock releasing state.

According to an exemplary embodiment, with the first icon 10, the second icon 20, and the third icon 30 turned on, when a designated period of time has elapsed or when a designated user input is received, the processor 150 may turn off the first icon 10 and set the lock setting state to the first lock state as illustrated in FIG. 4B. The processor 150 may control the locking device to lock the charge cable 200 and the charge port 120 in the first lock state and unlock the charge cable 200 and the charge port 120 when charging is completed.

According to an exemplary embodiment, with the first icon 10, the second icon 20, and the fourth icon 40 turned on, when a designated period of time has elapsed or when a designated user input is received, the processor 150 may turn off the first icon 10 and set a lock setting state to the second lock state, as illustrated in FIG. 4C. The processor 150 may control the locking device 130 to maintain locking even after charging is completed in the second lock state in which the charge cable 200 and the charge port 120 are locked. According to an exemplary embodiment, in the second lock state, the processor 150 may release locking according to a user input received from an interior of a vehicle or through an application.

According to an exemplary embodiment, in the state in which lock setting is available (for example, in a state in which the first icon 10 is turned on), the processor 150 may turn on the first icon 10, the second icon 20, the third icon 30, and the fourth icon 40 in a first color (for example, green). According to an exemplary embodiment, in the first lock state, the processor 150 may turn on the second icon 20 and the third icon 30 in a second color (for example, orange). According to an exemplary embodiment, in the second lock state, the processor 150 may turn on the second icon 20 and the fourth icon 40 in a third color (for example, red). Accordingly, the user may recognize the lock setting state according to whether the plurality of icons included in the button 140 are turned on and through a color of a turned-on icon.

Figure 5A:
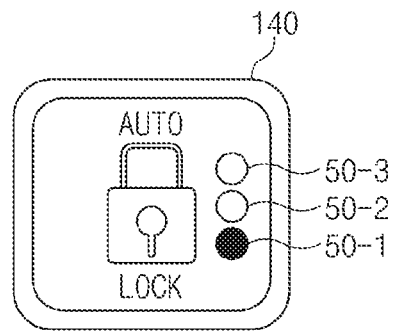
FIGS. 5A-5C are views illustrating a button according to another exemplary embodiment.
Figure 5B:
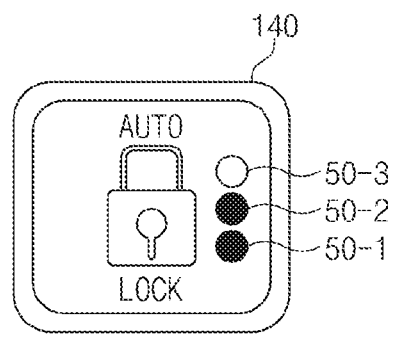
Figure 5C:
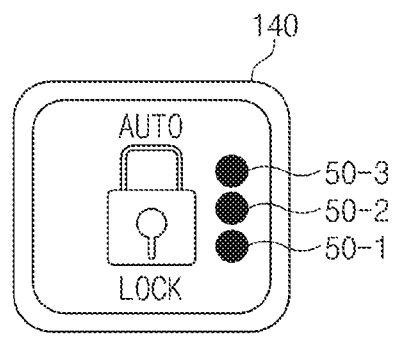

FIGS. 5A-5C are views illustrating a button according to another exemplary embodiment in the present disclosure.

According to an exemplary embodiment, the button 140 may include at least one (for example, three) fifth icons (hereinafter, referred to as "charge state icons") 50-1, 50-2, and 50-3 indicating a charge state of a battery.

The processor 150 may change the number of the at least one turned-on charge state icon 50-1, 50-2, and 50-3 and a turned-on color according to a charge state (for example, a charge amount) of the battery 110. For example, referring to FIG. 5A, when a charge amount of the battery 110 is less than a first reference amount (for example, 25%), the processor 150 may turn on the first charge state icon 50-1 in a red color and control the first charge state icon 50-1 to flicker. In another example, referring to FIG. 5B, when a charge amount of the battery 110 is equal to or greater than the first reference amount (for example, 25%) and less than a second reference amount (for example, 50%), the processor 150 may turn on the first charge state icon 50-1 and the second charge state icon 50-2 in a red color and control the second charge state icon 50-2 to flicker. In another example, when a charge amount of the battery 110 is equal to or greater than the second reference amount (for example, 50%) and less than a third reference amount (for example, 75%), the processor 150 may turn on the first charge state icon 50-1 and the second charge state icon 50-2 in an orange color and control the second charge state icon 50-2 to flicker. In another example, referring to FIG. 5C, when a charge amount of the battery 110 is equal to or greater than the third reference amount (for example, 75%) and less than a fourth reference amount (for example, 100%), the processor 150 may turn on the first charge state icon 50-1, the second charge state icon 50-2, and the third charge state icon 50-3 in a green color and control the third charge state icon 50-3 to flicker.

In another example, when a charge amount of the battery 110 is equal to or greater than the fourth reference amount (for example, 100%), the processor 150 may turn on the first charge state icon 50-1, the second charge state icon 50-2, and the third charge state icon 50-3 in a green color. Accordingly, the user may recognize a charge amount of the battery 110 and whether charging of the battery 110 has been completed through the number of turned-on charge state icons 50-1, 50-2, and 50-3 included in the button 140 and a turned-on color thereof.

In the aforementioned exemplary embodiment, it is described that the button 140 is included in the charging device 100 for a vehicle, but according to another exemplary embodiment, the button 140 may be included in the charge cable 200. The charge cable 200, in a state of being connected to the charge port 120, may be electrically connected to the charging device 100 for a vehicle. For example, in a state in which the charge cable 200 is connected to the charge port 120, the user may set a lock setting state of the charge cable 200 and the charge port 120 by operating the button 140 included in the charge cable 200. According to another exemplary embodiment, the charging device 100 for a vehicle and the charge cable 200 may separately include a button. For example, the user may set a lock setting state of the charge cable 200 and the charge port 120 by operating a button included in the charge cable 200 or the button 140 included in the charging device 100 for a vehicle.

Figure 6:
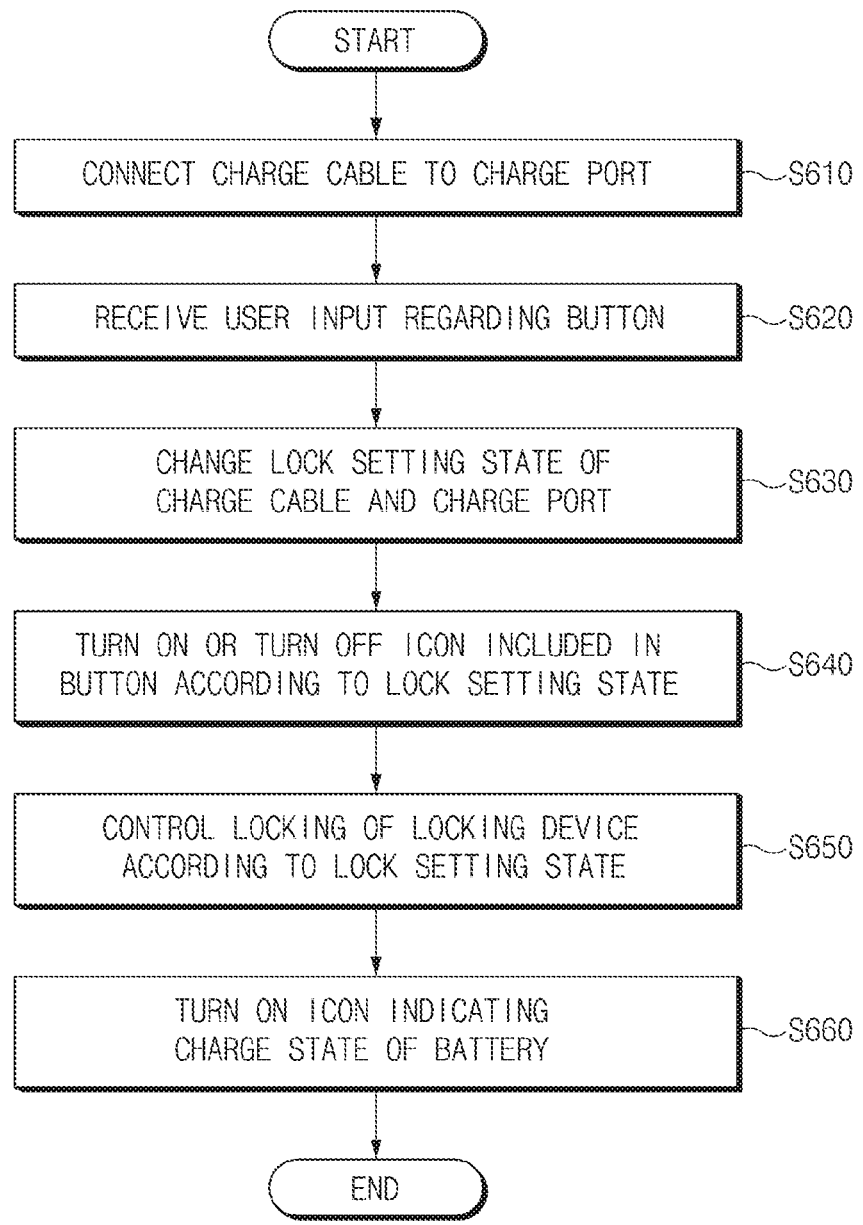
FIG. 6 is a flow chart illustrating a method for controlling a charging device for a vehicle according to an exemplary embodiment.

FIG. 6 is a flow chart illustrating a method for controlling a charging device for a vehicle according to an exemplary embodiment in the present disclosure.

The flow chart illustrated in FIG. 6 may include operations processed by the charging device 100 illustrated in FIG. 1. Thus, even though contents described regarding the charging device 100 with reference to FIGS. 1 to 5 is omitted hereinafter, the same contents may also be applied to the flow chart illustrated in FIG. 6.

Referring to FIG. 6, a charge cable may be connected to the charge port 120 included in the charging device 100 for a vehicle in operation S610. When a charge cover protecting the charge port 120 is opened or the charge cable 200 is connected to the charge port 120, the charging device 100 for a vehicle may turn on a first icon included in a button. The button may include a plurality of icons turned on according to a lock setting state. For example, the button may include a first icon indicating whether locking is available to be set, a second icon indicating whether locking has been set, a third icon indicating a first lock state, a fourth icon indicating a second lock state, and at least one fifth icon indicating a charge state of the battery.

The charging device 100 for a vehicle may receive a user input regarding the button in operation S620. For example, the charging device 100 for a vehicle may receive a user input that presses the button or that touches the button. According to an exemplary embodiment, the button may be positioned within the charge cover.

The charging device 100 for a vehicle may change a lock setting state of the charge cable and the charge port according to a user input regarding the button in operation S630. The lock setting state may include, for example, a lock releasing state in which locking has not been set, a first lock state in which locking, which has been set, is released when charging is completed, and a second lock state in which locking, which has been set, is maintained even after charging is completed.

When a user input regarding the button is received with the first icon 10 turned on, the charging device 100 for a vehicle may change the lock setting state. When a user input regarding the button is received with the first icon 10 turned off, the charging device 100 for a vehicle may not change the lock setting state.

The charging device 100 for a vehicle may sequentially change the lock setting state each time a user input is received. For example, when a user input regarding the button is received in the lock releasing state, the charging device 100 for a vehicle may set the lock setting state to the first lock state, and when a user input regarding the button is received in the first lock state, the charging device 100 for a vehicle sets the lock setting state to the second lock state, and when a user input regarding the button is received in the second lock state, the charging device 100 for a vehicle may set the lock setting state to the lock releasing state. The charging device 100 for a vehicle may turn on or turn off an icon included in the button according to the lock setting state in operation S640. According to an exemplary embodiment, when a user input regarding the button is received with only the first icon turned on, the charging device 100 for a vehicle may turn on the second icon and the third icon. The state in which the second icon 20 and the third icon 30 are turned on may correspond to the first lock state in which locking, which has been set, is released when charging is completed, for example. According to an exemplary embodiment, when a user input with respect to the button 140 is received with the first icon 10, the second icon 20, and the third icon 30 turned on, the charging device 100 for a vehicle may turn off the third icon 30 and turn on the fourth icon 40. The state in which the second icon 20 and the fourth icon 40 are turned on may correspond to the second lock state in which locking, which has been set, is maintained even after charging is completed, for example. According to an exemplary embodiment, when a user input with respect to the button 140 is received with the first icon 10, the second icon 20, and the fourth icon 40 turned on, the charging device 100 for a vehicle may turn off the second icon 20 and the third icon 30. The state in which the second icon 20, the third icon 30, and the fourth icon 40 are turned off may correspond to a lock releasing state in which locking is not set, for example. When a designated time (for example, 30 seconds) has lapsed or when a designated user input (for example, when a button is pressed for more than a designated period of time or when the button is touched for a designated period of time) is received with the first icon 10 turned on, the charging device 100 for a vehicle may turn off the first icon 10.

The charging device 100 for a vehicle may control locking of the locking device according to a lock setting state in operation S650. When a designated time has elapsed or a designated user input is received with the first icon turned on, the charging device 100 for a vehicle may turn off the first icon and finally determine a lock setting state.

The charging device 100 for a vehicle may control the locking device to unlock the charge cable from the charge port in the lock releasing state. When the charge cable and the charge port are locked in the first lock state and charging is completed, the charging device 100 for a vehicle may control the locking device to release locking. The charging device 100 for a vehicle may control the locking device to maintain locking even after charging is completed in the second lock state in which the charge cable and the charge port are locked. According to an exemplary embodiment, in the second lock state, the charging device 100 for a vehicle may release locking according to a user input received from an interior of a vehicle or through an application.

The charging device 100 for a vehicle may turn on at least one icon (or a charge state icon) indicating a charge state of the battery in operation S660. The charging device 100 for a vehicle may change the number of at least one turned-on charge state icon and a turned-on color according to a charge state (for example, a charge amount) of the battery.

As described above, according to various exemplary embodiments of the present disclosure, interference with or burglary of a charge cable may be prevented while the battery is being charged, and a lock state may be simply set through the button. Also, the user may recognize a current lock setting state and a charge amount through the icons included in the button.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A charging device for a vehicle, the charging device comprising:
   a charge port connected to a charge cable and accessible from the outside of the vehicle;
   a locking device locking the charge cable to the charge port;
   a battery configured to be charged by electric power supplied from the charge cable;
   a button including an icon that is turned on according to a lock setting state and accessible from the outside of the vehicle; and
   a processor configured to change a lock setting state of the charge cable and the charge port according to a user input received through the button, turn on or turn off the icon included in the button according to the lock setting state, and control locking of the locking device according to the lock setting state,
   wherein the icon that is turned on in the button is changed according to the lock setting state.

2. The charging device according to claim 1, wherein the lock setting state includes a lock releasing state in which locking has not been set, a first lock state in which locking is set and unset when charging is completed, and a second lock state in which locking is set and maintained after charging is completed.

3. The charging device according to claim 2, wherein the processor sets the lock setting state to the first lock state when the user input is received through the button in the lock releasing state, the processor sets the lock setting state to the second lock state when the user input is received through the button in the first lock state, and the processor sets the lock setting state to the lock releasing state when the user input is received through the button in the second lock state.

4. The charging device according to claim 1, wherein the button includes a first icon indicating whether locking is available to be set, a second icon indicating whether locking has been set, a third icon indicating a first lock state, and a fourth icon indicating a second lock state.

5. The charging device according to claim 4, wherein the processor changes the lock setting state when a user input is received through the button and the first icon is on, and does not change the lock setting state when a user input is received through the button and the first icon is off.

6. The charging device according to claim 4, wherein the processor turns off the first icon when a designated user input is received through the button, or when a designated period of time has elapsed after the first icon was turned on.

7. The charging device according to claim 4, wherein
the processor turns on the second icon and the third icon when a user input is received through the button with the first icon turned on,
turns off the third icon and turns on the fourth icon when a user input is received through the button with the first icon, the second icon, and the third icon turned on, and
turns off the second icon and the fourth icon when a user input is received through the button with the first icon, the second icon, and the fourth icon turned on.

8. The charging device according to claim 1, wherein the button includes at least one icon indicating a charge state of the battery, and the processor changes at least one of a number and a color of turned-on icons according to the charge state of the battery.

9. The charging device according to claim 1, further comprising a charge cover configured to be opened and closed and to protect the charge port,
wherein the button is positioned within the charge cover.

10. A method for controlling a charging device for a vehicle, the method comprising steps of:
connecting a charge cable to a charge port accessible from the outside of the vehicle;
receiving a user input through a button accessible from the outside of the vehicle;
changing a lock setting state of the charge cable and the charge port according to the user input;
turning on or turning off an icon included in the button according to the lock setting state; and
controlling locking of a locking device locking the charge cable to the charge port according to the lock setting state,
wherein the icon that is turned on in the button is changed according to the lock setting state.

11. The method according to claim 10, wherein the lock setting state includes a lock releasing state in which locking has not been set, a first lock state in which locking is set and unset when charging is completed, and a second lock state in which locking is set and maintained after charging is completed.

12. The method according to claim 11, wherein the step of changing the lock setting state includes steps of:
setting the lock setting state to the first lock state when the user input is received through the button in the lock releasing state;
setting the lock setting state to the second lock state when the user input is received through the button in the first lock state; and
setting the lock setting state to the lock releasing state when the user input is received through the button in the second lock state.

13. The method according to claim 10, wherein the button includes a first icon indicating whether locking is available to be set, a second icon indicating whether locking has been set, a third icon indicating a first lock state, and a fourth icon indicating a second lock state.

14. The method according to claim 13, wherein the step of changing the lock setting state includes steps of:
changing the lock setting state when the user input regarding the button is received with the first icon turned on; and
not changing the lock setting state when the user input is received through the button with the first icon turned off.

15. The method according to claim 13, wherein the step of turning on or turning off the icon included in the button includes:
turning off the first icon when a designated user input is received through the button, or when a designated period of time has elapsed after the first icon was turned on.

16. The method according to claim 14, wherein the step of turning on or turning off of the icon included in the button includes steps of:
turning on the second icon and the third icon when a user input regarding the button is received with the first icon turned on,
turning off the third icon and turning on the fourth icon when a user input regarding the button is received with the first icon, the second icon, and the third icon turned on, and
turning off the second icon and the fourth icon when a user input regarding the button is received with the first icon, the second icon, and the fourth icon turned on.

17. The method according to claim 10, wherein the button includes at least one icon indicating a charge state of a battery, and
the method further comprises a step of:
changing at least one of a number and a color of turned-on icons according to the charge state of the battery.

18. The method according to claim 10, wherein the button is positioned within a charge cover configured to be opened and closed and protect the charge port.

* * * * *